United States Patent
Dawson

(10) Patent No.: US 7,788,491 B1
(45) Date of Patent: *Aug. 31, 2010

(54) USE OF ENCRYPTION FOR SECURE COMMUNICATION EXCHANGES

(75) Inventor: Travis Dawson, San Mateo, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1329 days.

This patent is subject to a terminal disclaimer.

(21) Appl. No.: 11/272,224

(22) Filed: Nov. 10, 2005

Related U.S. Application Data

(60) Provisional application No. 60/728,961, filed on Oct. 21, 2005.

(51) Int. Cl.
*H04L 9/32* (2006.01)

(52) U.S. Cl. .................................... 713/168; 709/238

(58) Field of Classification Search ................. 713/168; 726/2, 22
See application file for complete search history.

(56) References Cited

U.S. PATENT DOCUMENTS

| | | | |
|---|---|---|---|
| 6,185,685 B1 * | 2/2001 | Morgan et al. | 713/183 |
| 6,904,522 B1 * | 6/2005 | Benardeau et al. | 713/156 |
| 7,017,041 B2 * | 3/2006 | Sandhu et al. | 713/156 |
| 7,353,388 B1 * | 4/2008 | Gilman et al. | 713/168 |
| 7,441,043 B1 * | 10/2008 | Henry et al. | 709/238 |

* cited by examiner

*Primary Examiner*—Pramila Parthasarathy

(57) ABSTRACT

A system and method for exchanging secure communications between devices. A broadcast message is periodically transmitted. The broadcast message contains a public key. A response to the broadcast message is received from a client device. The response is encrypted with use of the public key. Further, the response contains the client's public key. Messages encrypted with the client's public key are communicated to the client device.

12 Claims, 5 Drawing Sheets

USE OF ENCRYPTION FOR SECURE COMMUNICATION EXCHANGES

CROSS-REFERENCE TO RELATED APPLICATIONS

This application claims the benefit of U.S. Provisional Application No. 60/728,961, filed Oct. 21, 2005.

STATEMENT REGARDING FEDERALLY SPONSORED RESEARCH OR DEVELOPMENT

Not applicable.

BACKGROUND

In recent years, use of portable computing devices has significantly grown, along with the capabilities and popularity as such devices. Local area networks, such as wireless networks, allow users to wirelessly access and communicate with other networked devices and with the Internet. For example, a wireless network may be accessible in an area known as a hotspot. Such a hotspot may be used by the public for browsing the Internet and for e-mail communications. Hotspots and other network connection points can provide Internet access in almost any location. For example, wireless networks are now accessible in libraries, airport terminals, coffeehouses and other establishments that provide public and/or membership access to the Internet.

Some drawbacks have been experienced with respect to establishing secure communications between portable devices and a network. For example, the portable computing devices may need to be authenticated and/or use appropriate encryption to communicate with the network. Other information may also be necessary to establish communications between a given device and the network. In one example, a user may desire to access the Internet at a hotspot. If the user has a prior relationship with the service provider, the user may be in possession of authentication or encryption information and may use this information to establish a secure connection to the network. However, not all potential users, including new customers, have the information necessary to authenticate their device and/or to establish secure communications with the network. Thus, in the absence of a prior relationship with the service provider, the user must engage in unsecured communications. Such unsecured communications may include transmission of a password or other sensitive information. As will be appreciated by those skilled in the art, unscrupulous third parties may intercept the unencrypted or unsecured communications. With continuing and growing privacy concerns associated with Internet activities, it is undesirable for any information to be communicated in an unsecured manner. Accordingly, there is a need for improved techniques for establishing secure communication between a portable device and a network.

SUMMARY

The present invention meets the above needs and overcomes one or more deficiencies in the prior art by providing a system and method for establishing a secure communication channel between an access control device and a client device. In one aspect of the present invention, a computer-implemented method is provided for exchanging secure communications between an access control device and a client device. A broadcast message is periodically transmitted. The broadcast message contains the access control device's public key. A response to the broadcast message is received from the client device. The response is encrypted with use of the access control device's public key. Further, the response contains the client's public key. The access control device can then decrypt the response with its private key and can decipher the client's public key. Using the client's public key, the access control device can communicate encrypted messages to the client device.

Another aspect of the present invention is a system for exchanging encrypted data. The system includes an access control device that is configured to repeatedly transmit a broadcast message. The broadcast message may indicate the presence of the access control device and may include a public key associated with the access control device. A client device is configured to receive the broadcast message and to communicate a response to the message. The response may be encrypted with use of the public key.

A further aspect of the present invention includes a computer-readable media having computer-useable instructions for performing a method of controlling access to network data. A first public key and a first private key are generated. The first public and private keys, for example, may be associated with an access control device. The first public key is transmitted as part of a broadcast signal. A response to the broadcast signal is received from a client device. This response contains a second public key. The second public key may be associated with a client device. An access control device may then transmit messages encrypted with the second public key to the client device.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for establishing a secure communication channel between an access control device and a client device. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

Figure 1:
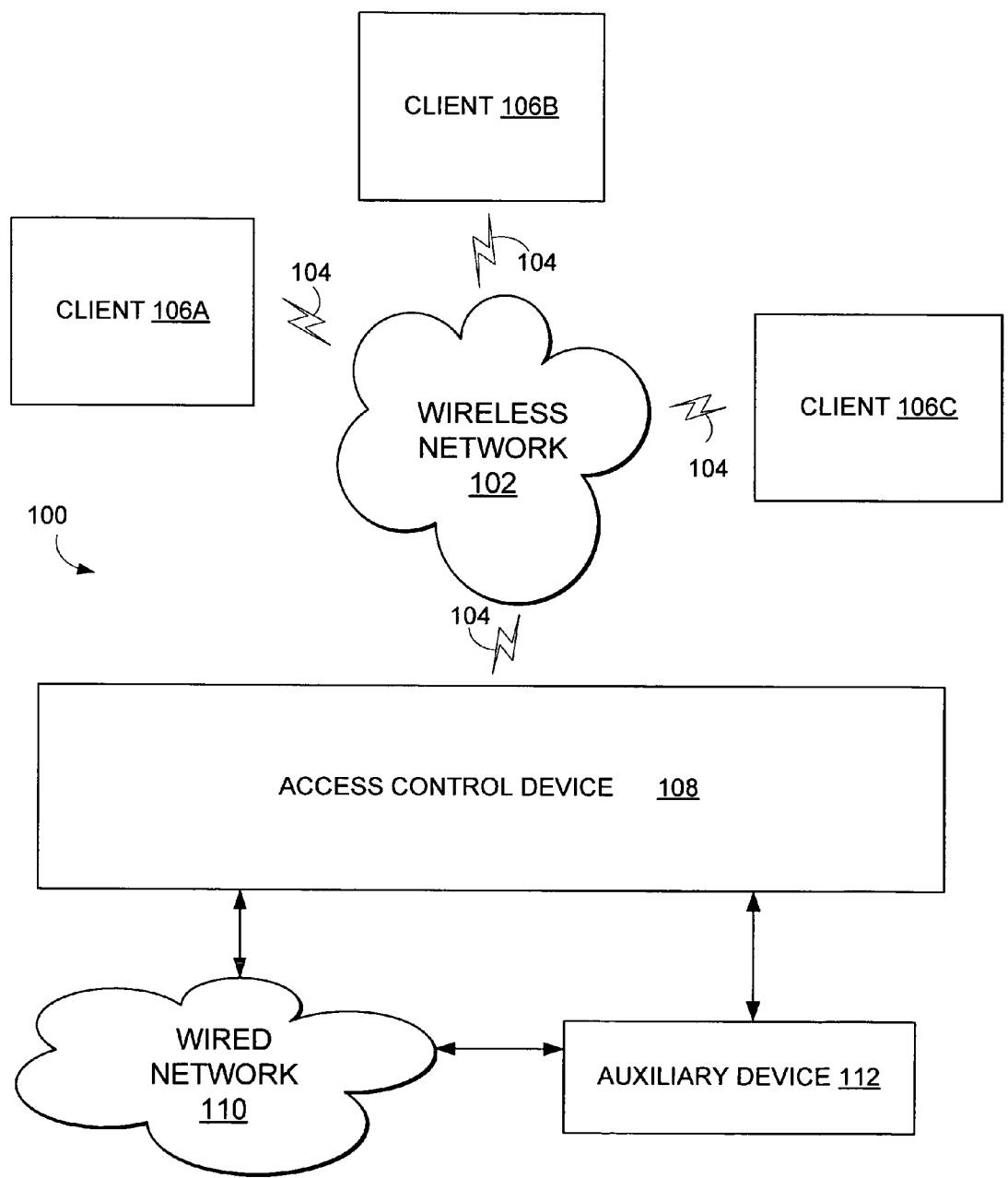
FIG. 1 is a schematic diagram representing a network configured to securely exchange communications in accordance with an embodiment of the present invention.

FIG. 1 illustrates a system 100 for exchanging secure communications between devices over a network. Of course, a network system may be arranged in a variety of configurations, and the system 100 of FIG. 1 provides only an exemplary network environment in which the present invention may operate.

The system 100 includes a wireless network 102 that is created by the exchange of wireless communications 104. Any variety of wireless technologies known in the art may be acceptable for use with the present invention. For example, the wireless network 102 may rely on aspects of Wi-Fi or cellular technologies. The wireless network 102 may allow communication between mobile devices and local area networks, as well communications with other networks including the Internet. Those skilled in the art will recognize that any number of different devices may comprise the wireless network 102 and that any number of protocols or technologies may be utilized by computing devices to communicate with the wireless network 102.

The system 100 also includes clients 106A, 106B and 106C (collectively hereinafter the "clients 106"). The clients 106 may be any computing devices capable of wirelessly communicating with the network 102 (i.e. transmitting and receiving the wireless communications 104). The system 100 further includes an access control device 108 to control the network access of the clients 106 and to act as an arbitrator of the network 102. In one embodiment, each of the wireless communications 104 is transmitted to or from the access control device 108. When the clients 106 are within range of the access control device 108, they are capable of wirelessly communicating with the access control device 108 and, thus, with the wireless network 102. Further, the access control device 108 may generate a hotspot in which the clients 106 can receive the wireless communications 104 that are transmitted by the access control device 108.

The access control device 108 is also connected to a wired network 110, and can relay data between the clients 106 and the wired network 110. Thus, the access control device 108 may be an access point for the clients 106 to access the wired network 110. The wired network 110, for example, may include the Internet. Further, an auxiliary device 112 is also connected to the access control device 108 and to the wired network 112. The auxiliary device 112 may assist the access control device 108 in controlling the network and may reside locally or in a remote location. In one embodiment, each communication with the clients 106 may reach the auxiliary device 112. In this embodiment, the auxiliary device 112 may ultimately control the network access of the clients 106. Alternatively, the clients 106 may gain access to the auxiliary device 112 via the wired network 110. Those skilled in the art will recognize that the access control device 108 may control access to any number of networks and any number of computing devices.

In one embodiment of the present invention, the access control device 108 is configured to repeatedly transmit a broadcast message indicating its the presence. Those skilled in the art will recognize that access control devices commonly transmit broadcast messages to advertise their presence and the existence of a hotspot. These broadcast messages may be referred to as Service Set Identifier ("SSID") broadcasts. Typically these broadcast messages contain connection information and the name of the access control device. The broadcast message may be transmitted multiple times in succession. These multiple transmissions in succession may occur at a constant frequency or may occur intermittently.

In one embodiment of the present invention, the broadcast message contains a public key. Public-key cryptography (or asymmetric-key cryptography) is a form of cryptography well known in the art that allows users to communicate securely without previously agreeing on a shared secret key. As will be appreciated by those skilled in the art, with public-key cryptography, users can communicate securely over an insecure channel without having agreed upon a key beforehand. Public-key algorithms use a pair of two related keys—one key is private and is kept secret, while the other is made public and can be widely distributed. Public keys allow a user to encrypt a message. Once encrypted with a public key, the message can only be decrypted with use of the related private key. Thus, a message encrypted with a public key can be transmitted securely over insecure channels because only a user in possession of the related, private key can decipher the message. In one scenario, each party generates a public and a private key. For two parties to communicate securely, they must exchange public keys. By encrypting each message by using the other party's public key, they can exchange communications that are capable of being decrypted only by the other party. This secure exchange may be referred to as an asymmetrically encrypted communication channel. Those skilled in the art will recognize that such communication channels are well known in the art and that any number of communications may use this form of cryptography.

The access control device 108 may disseminate its public key in a broadcast message, while keeping its private key secret. Further, the clients 106 may be configured to communicate responses to the broadcast message that are encrypted with the public key of the access control device 108. Because only the access control device 108 can decrypt the responses with its private key, these responses will be protected from unauthorized interception. In one embodiment, a client's response may contain a public key of that client. In this case, the client and the access control device 108 will have the other's public key, and an encrypted communication channel can be established between the two devices. As will be discussed in greater detail, once a secure communication channel is established between a client and the access control device 108, any number of techniques may be utilized to maintain or alter the communication channel.

Figure 2:
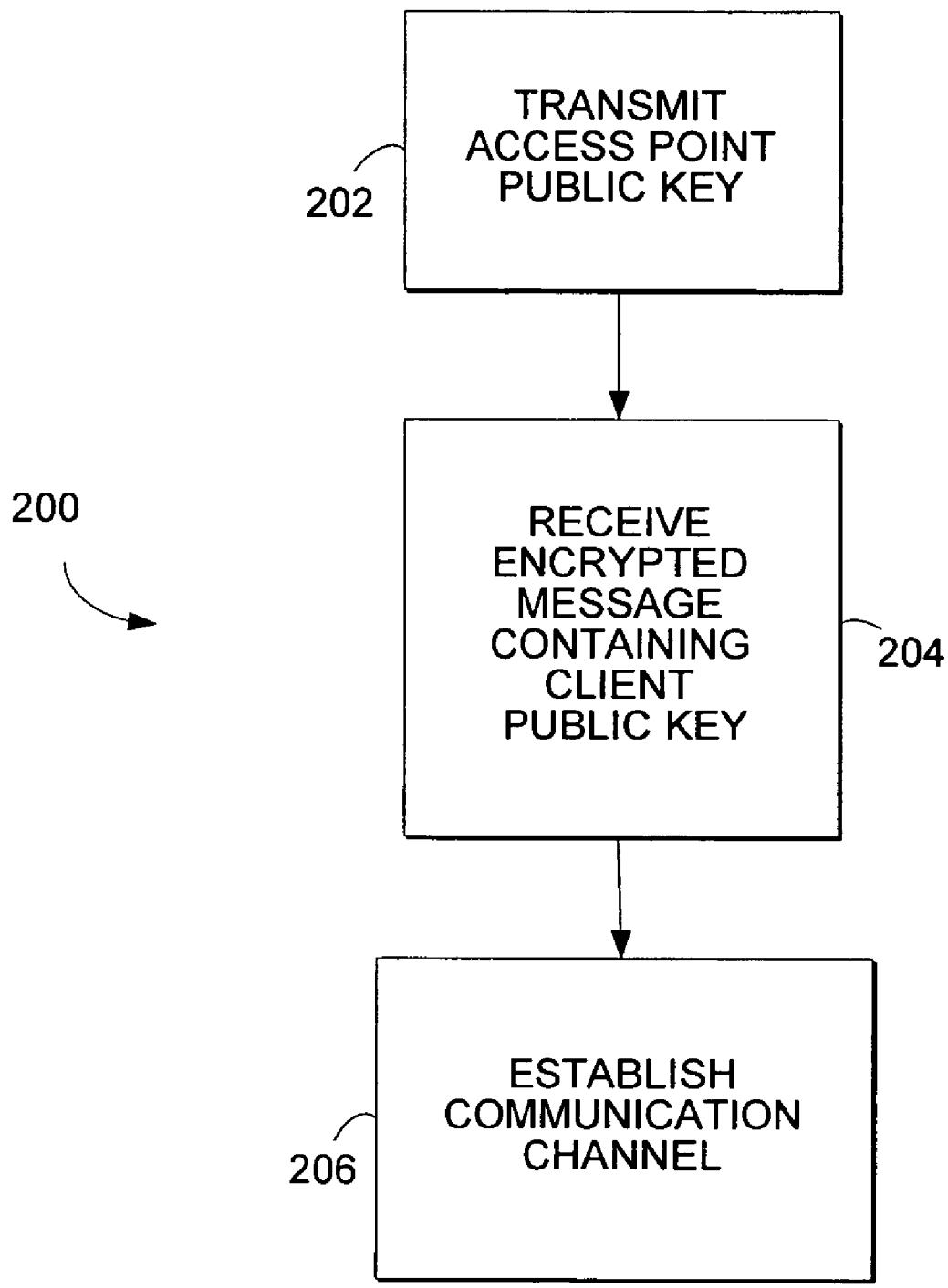
FIG. 2 is a flow diagram showing a method for establishing a secure communication channel between an access control device and a client device in accordance with an embodiment of the present invention.

FIG. 2 illustrates a method 200 for establishing a secure communication channel between an access control device and a client device. At a step 202, the access control device transmits a broadcast message that includes a public key. Any access control device that transmits a broadcast message may be acceptable for use with the present invention. For example, an access control device may reside in a hotspot offering wireless Internet access. Client computers attempting to access the Internet in the hotspot may negotiate such access with the access control device. The access control device may also reside on a wired network, and the access control device may output broadcast signals on that network. In one embodiment, each of the network communications with a client is transmitted to or from an access control device.

After receiving the broadcast message, a client device may transmit a response to the message to gain access to a network, and at a step 204, the method 200 receives a response from a client device. Preferably, the response may be encrypted with the access control device's public key, and, to decipher this response, the access control device must use its private key. Because only the access control device has a private key capable of decrypting the response, sensitive information such as passwords may be securely transmitted to the access control device. The client's response may also contain the client's public key. By supplying the access control device with the client's public key, secure communications between the access control device and the client may be enabled.

At a step 206, the method 200 establishes a communication channel for exchanging secure communications between the access control device and the client. Each message from the access control device to the client is encrypted with the client's public key. Only the client, using its private key, can decrypt these messages. Similarly, each message from the client to the access control device is encrypted with the access control device's public key, and only the access control device can decipher these messages through use of its private key. Those skilled in the art will appreciate that such an asymmetrically encrypted communication channel is well known in the art and that any number of communications may be exchanged in this channel. For example, the client and the access control device may generate/communicate a new encryption key such as a symmetric key. A symmetric encryption key is well known in the art and may be used in both encrypting and decrypting a message. Thus, when both the access control device and the client are in possession of the new symmetric key, a symmetrically encrypted communications channel may be established using this single key. In one embodiment of the present invention, the keys of the access control device and/or the client may be periodically changed. Accordingly, the method 200 must be repeated to re-establish the communication channels.

Figure 3:
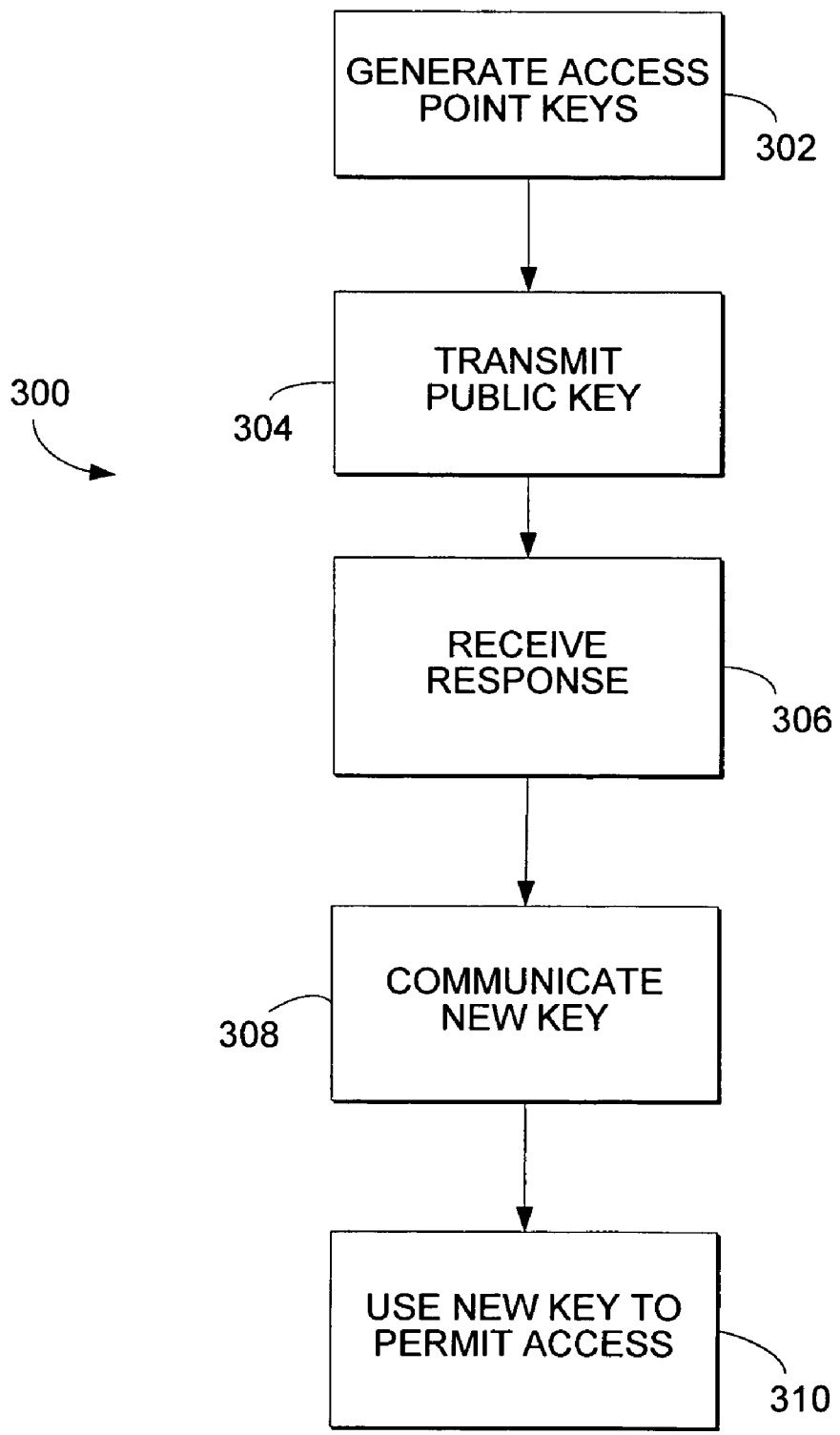
FIG. 3 is a flow diagram showing a method for controlling access to network data in accordance with an embodiment of the present invention.

FIG. 3 illustrates a method 300 for controlling access to network data. At a step 302, the method 300 generates a public key and a private key. The public key may be used with an encryption algorithm, while the private key may be used with a decryption algorithm. The decryption algorithm should be capable of decrypting data that was encrypted with the encryption algorithm. While any encryption or decryption algorithms may be acceptable for use with the present invention, those skilled in the art will recognize that public-key cryptography (also known as asymmetric-key cryptography) may be well-suited for use with the method 300. Examples of well known asymmetric key algorithms include Diffie-Hellman, RSA encryption, ElGamal and elliptic curve cryptography. Further, examples of protocols using asymmetric key algorithms include Digital Signature Standard, PGP and Secure Socket Layer.

At a step 304, the method 300 transmits a broadcast signal that includes the public key. The transmission may be wireless or over a wired network, and it may emanate from a device configured to control access to network data. For example, client devices may be required to interact with an access device before the client may use the network. The broadcast signal may further include other information such as data needed to connect to the access control device.

The method 300 receives a response to the broadcast signal at a step 306. The response may contain a public key associated with a client. As will be appreciated by those skilled in the art, client machines may also generate a public-private key pair. By responding to the broadcast message with the client's public key, both the access device and the client will be in possession of the other's public key, and an asymmetrically encrypted communication channel may be established between the two devices. Further, because the response is encrypted, sensitive information such as passwords or credit card numbers can be securely transmitted along with the response. In one embodiment, a variety of command and control communications are exchanged via the asymmetrically encrypted communication channel before access to network data is permitted At a step 308, the method 300 generates a new key for use in both encrypting and decrypting the data. Such a key is known in the art as a symmetric key. Symmetric-key algorithms are a class of algorithms that use a cryptographic key or keys for both decryption and encryption. The symmetric key represents a shared secret between two or more parties that can be used to maintain a private information link. As will be appreciated by those skilled in the art, symmetric-key algorithms are generally much faster to execute electronically than asymmetric key algorithms.

Because the client and the access device have a secure asymmetrically encrypted communication channel, they may generate and securely exchange the symmetric key. In one embodiment, the two devices each contribute a portion of the symmetric key, though either device could individually create the new key. Once both the client and the access device are in possession of the symmetric key, a symmetrically encrypted communication channel may be established, and, at a step 310, the method 300 allows the client access to network data via the symmetrically encrypted communication channel. For example, a client computer residing in hotspot may wirelessly respond to an access control device's broadcast signal. After negotiating with the control device via the asymmetrically encrypted communication channel, the client may be permitted Internet access via the symmetrically encrypted communication channel.

Figure 4:
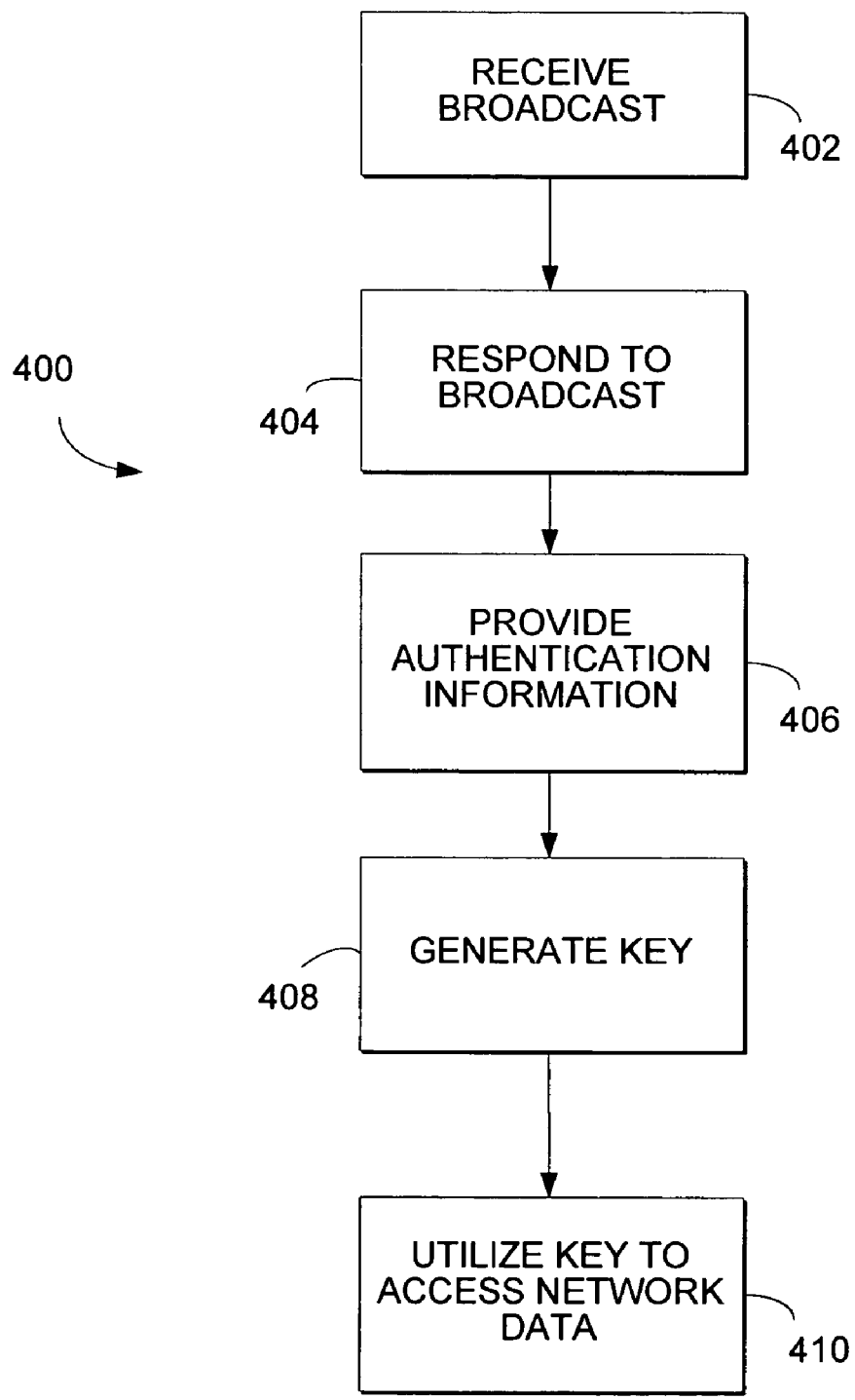
FIG. 4 is a flow diagram showing a method for securely obtaining access to network data in accordance with an embodiment of the present invention.

FIG. 4 illustrates a method 400 for securely obtaining access to network data. At a step 402, a client device receives a broadcast signal advertising the availably of a network. The client device may be any device capable of communicating with a network and detecting the broadcast signal. For example, the client may have hardware supporting use of wireless networking technologies, or the client may have a network card capable of communication with wired networks. The broadcast message may include any information making a network available, and a public key may be appended to the broadcast message.

At a step 404, a response to the broadcast is made. As part of this response, a public key associated with the client is included. As previously discussed, the client's public key allows others to securely transmit communications to the client, and, once the client is in possession of the access device's public key, the client can also securely transmit information to the access device. In one preferred embodiment, the response in encrypted with the public key contained in the broadcast.

At a step 406, the client transmits authentication information to the access device in a message that is encrypted with the access device's public key. This authentication information may include a user ID and password or a certificate. Payment information may also be transmitted. The access device may be capable of receiving the authentication information, decrypting it with its private key, and determining whether network access should be granted to the client. Those skilled in the art will recognize that any number of secure exchanges may be made between the two devices to negotiate the client's network access.

If network access should be granted to the client device, the access device may notify the client of such access with a message encrypted with the client's public key. Further, the method 400 generates a symmetric key for use by the client to access network data at a step 408. The key may be communicated to the client and/or to the access control device via the existing asymmetrically encrypted communication channel. Because the symmetric key is in the possession of both the client and the access device, this key may be used to establish a symmetrically encrypted communication channel between the devices. At a step 410, the method 400 allows the client access to the network data via the symmetrically encrypted communication channel. Those skilled in the art will appreciate that use of the symmetrically encrypted communication channel may provide a secure and expedient means to exchange network data.

Figure 5:
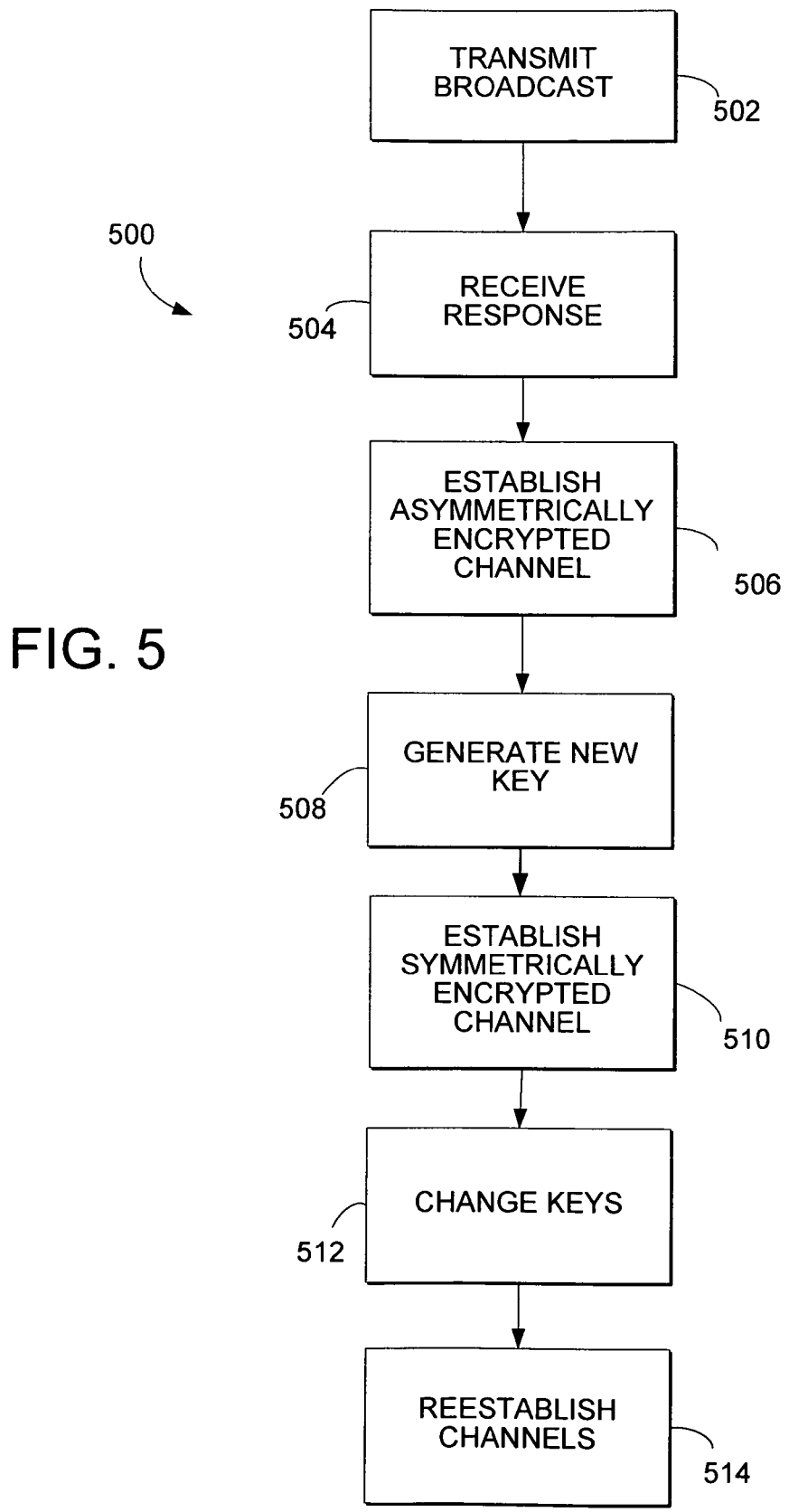
FIG. 5 is a flow diagram showing a method for maintaining communications channels between an access control device and a client device in accordance with an embodiment of the present invention.

FIG. 5 illustrates a method 500 for maintaining secure communications channels between an access control device and a client. At a step 502, a broadcast signal that includes a public key is transmitted. The broadcast message may be transmitted multiple times in succession and, these transmissions in succession may occur periodically or intermittently.

Following the transmission, a response to the broadcast signal is received at a step 504. The response may contain a public key associated with the client. Upon receipt of the response, each the access device and the client are in possession of the other's public key, and an asymmetrically encrypted communication channel is established between the two devices at a step 506.

At a step 508, the method 500 generates a symmetric key that may be used for both encrypting and decrypting the data. In one embodiment, using the asymmetrically encrypted communication channel, the client and the control device may generate and exchange the shared, symmetric key. For example, the two devices may each contribute half of the symmetric key. Once both the client and the access device are in possession of the symmetric key, a symmetrically encrypted communication channel is established at step 510.

At a step 512, at least one of the keys is changed. Those skilled in the art will recognize that, to ensure the keys are not compromised, a periodic re-keying may be appropriate. For example, the access control device may change its public and private keys. This change would, thus, destroy the asymmetrically encrypted communication channel. Also, the symmetric key may be changed by one of the devices, which would destroy the symmetrically encrypted communication channel. In one embodiment, before a key is changed, a message is transmitted that contains a notification of the impending change and/or provides the new key.

At a step 514, the method 500 re-establishes the communication channel(s). Various exchanges may be acceptable to re-establish the various channels. For example, the steps 502—510 may be repeated. Further, when the asymmetric and symmetric keys are changed at different times, an existing channel may be used to communicate information re-establishing the other. For example, if the symmetric key is changed while the asymmetrically encrypted communication channel is intact, the new symmetric key may be communicated via the asymmetrically encrypted communication channel. Those skilled in the art will recognize that any number of communication exchanges may be used to re-establish the communication tunnels in accordance with the present invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method for exchanging secure communications between an access control device and a client device, the method comprising:

transmitting, by said access control device, a broadcast message that includes a first public key, wherein said broadcast message is transmitted via an unsecure transmission and wherein said client device is not in possession of said first public key prior to receiving said broadcast message;

receiving, by said access control device, a response to said broadcast message from said client device, wherein said response is encrypted with said first public key and contains a second public key;

utilizing a first private key to decrypt said response so as to retrieve said second public key;

communicating one or more messages to said client device, wherein said one or more messages are encrypted with said second public key, and utilizing said first public key and said second public key to establish a secure communication channel between said client device and said access control device.

2. The computer-implemented method of claim 1, further comprising receiving authentication information from said client device over said communication channel.

3. The computer-implemented method of claim 1, wherein said response is received over a wireless network.

4. One or more computer-readable media having computer-useable instructions embodied thereon to perform the method of claim 1.

5. A system for exchanging encrypted data between an access control device and one or more client devices, the system comprising:

an access control device that controls access by mobile devices to a network and configured to transmit an unsecure Service Set Identifier broadcast message indicating the presence of said access control device and including a public key, wherein said one or more client devices are not in possession of said public key prior to receiving said unsecure Service Set Identifier broadcast message; and said one or more client devices configured to receive said broadcast message and to communicate a response to said broadcast message, wherein said response is encrypted with use of said public key and includes a client public key associated with one of said one or more client devices, wherein said client public key is utilized by said access control device to send secure messages to said one of said one more client devices.

6. The system of claim 5, wherein said access control device is configured to transmit said broadcast message multiple times in succession over a wireless network.

7. The system of claim 5, wherein said access control device and said one or more client devices are configured to establish an asymmetrically encrypted communication channel.

8. The system of claim 7, wherein said access control device and said one or more client devices are configured to utilize said asymmetrically encrypted communication channel to establish a symmetrically encrypted communication channel.

9. One or more computer-readable media having computer-useable instructions embodied thereon for performing a method of controlling access to a network, the method comprising:

generating a public key and a private key, wherein said public key is configured for use with an encryption algorithm and wherein said private key configured for use with decrypting data encrypted with said public key;

transmitting, by an access control device, a broadcast signal multiple times in succession, wherein said broadcast signal includes said public key, wherein said broadcast message is transmitted via an unsecure transmission and without encryption and wherein a client device is not in possession of said public key prior to receiving said broadcast signal;

receiving a response to said broadcast signal from the client device, wherein said response contains a client public key and is encrypted with said public key;

receiving payment information from said client device, wherein said payment information is encrypted with said public key;

transmitting, by said access control device, one or more messages to said client device, wherein said one or more messages are encrypted with said client public key;

utilizing at least a portion of said one or more messages to communicate a new key for a symmetric key algorithm; and allowing said client device to access said network, wherein said new key is utilized to send one or more secure messages over said network.

10. The computer-readable media of claim 9, further comprising receiving authentication information from said client device, wherein said authentication information is encrypted with said client public key and is used to authenticate said client device.

11. The computer-readable media of claim 9, further comprising re-generating said public key and said private key periodically.

12. The computer-readable media of claim 9, wherein said broadcast signal is transmitted over a wireless network.

* * * * *